United States Patent [19]

Shiotani

[11] Patent Number: 6,033,747
[45] Date of Patent: Mar. 7, 2000

[54] BIODEGRADABLE LAMINATE

[75] Inventor: Takeshi Shiotani, Kakogawa, Japan

[73] Assignee: Kaneka Corporation, Osaka, Japan

[21] Appl. No.: 08/959,203

[22] Filed: Oct. 28, 1997

[30] Foreign Application Priority Data

Oct. 29, 1996 [JP] Japan ................................. 8-303836

[51] Int. Cl.$^7$ ................................................. B29D 22/00
[52] U.S. Cl. ........................ 428/34.3; 428/34.2; 428/481; 428/482; 428/537.5
[58] Field of Search .............................. 428/34.2, 34.3, 428/481, 482, 537.5

[56] References Cited

U.S. PATENT DOCUMENTS

| | | | |
|---|---|---|---|
| 4,880,592 | 11/1989 | Martini et al. | 264/514 |
| 5,292,860 | 3/1994 | Shiotani et al. | |
| 5,502,116 | 3/1996 | Noda. | |
| 5,536,564 | 7/1996 | Noda | 428/280 |
| 5,679,421 | 10/1997 | Brinton, Jr. | 428/34.3 |
| 5,693,389 | 12/1997 | Liggat | 428/35.7 |

FOREIGN PATENT DOCUMENTS

| | | |
|---|---|---|
| 6-135457A | 5/1994 | Japan. |
| 7-188432A | 7/1995 | Japan. |

*Primary Examiner*—Charles Nold
*Attorney, Agent, or Firm*—Birch, Stewart, Kolasch & Birch, LLP

[57] ABSTRACT

A laminate including a base material and a copolymer consisting essentially of 3-hydroxybutyrate and 3-hydroxyhexanoate, the copolymer being laminated on at least one side of the base material. A wrapping material including the above laminate. A container made of the above laminate.

9 Claims, No Drawings

BIODEGRADABLE LAMINATE

BACKGROUND OF THE INVENTION

1. Field of the Invention

The present invention relates to a laminate used for wrapping materials and containers, and more particularly to a biodegradable laminate comprising a base material and a biodegradable copolymer, the biodegradable copolymer being laminated on the base material. In addition, the present invention relates to a wrapping material comprising the laminate and a container made of the laminate.

2. Discussion of the Related Art

Conventionally, in the field of wrapping, laminates comprising plastic materials have been widely used as wrapping materials. In addition, as for containers, particularly paper containers, laminates comprising paper and plastics, the plastics being pasted together with the paper, have been used to form paper boxes, paper cups, paper trays, and the like. Such laminates are used because natural materials, such as paper, alone would not give sufficient mechanical strength and waterproofness. Presently, in order to meet requirements in such properties as rigidity, impact resistance, leakage inhibiting ability, heat seal property, and the like, polyolefins, such as polyethylenes and polypropylenes, are widely used as plastic materials for the above-described laminates.

In general, the mainstream of the paper containers mentioned above is a disposable container after a single use, and the paper containers are littered to be subjected to incineration treatment or land fill. However, when the paper containers are scattered as wastes in natural environments, the polyolefins remain without being degraded, thereby causing environmental pollution with the polyolefins.

In recent years, plastics which are dumped in large quantities have been noted as a pollutive source in the natural environments. In order to solve this problem, biodegradable plastics have been marked as plastics which are "gentle to environment," the biodegradable plastic being subjected to reduction to $CO_2$ and $H_2O$ when allowing the plastics to stand in natural environments by actions of microorganisms living in the environments. Since the biodegradable plastics undergo degradation by actions of microorganisms living in soils, rivers, and seawater during a period of several weeks to several years, paper containers made of such plastics in the end undergo degradation to $CO_2$ and $H_2O$, including even paper constituting the paper containers. Therefore, biodegradable plastics have been recently developed as a means of solving problems inherent in plastic wastes.

Presently, the following two kinds of aliphatic polyesters have been developed as the biodegradable plastics described above.

Microorganism-Produced Polyesters

A copolymer consisting of 3-hydroxybutyrate (3HB) and 3-hydroxyvalerate (3HV) (simply abbreviated as "p(3HB-CO-3HV)", which is made commercially available under a trade name "BIOPOL" (manufactured by ZENECA Limited).

Chemically Synthesized Polyesters

A polyester obtained by condensation polymerization of a particular dibasic acid and ethylene glycol, which is made commercially available under a trade name "BIONOLLE" (manufactured by Showa Kobunshi K.K.).

Paper containers comprising a laminate comprising p(3HB-CO-3HV) as a laminating material are disclosed in Japanese Patent Laid-Open Nos. 6-135457 and 7-188432. Paper containers comprising the above polyester obtained by condensation polymerization of a dibasic acid and ethylene glycol are disclosed in Japanese Patent Laid-Open No. 6-171030.

Among the above polyesters, the polyester obtained by condensation polymerization of a dibasic acid and ethylene glycol may have biodegradable properties; however, since heavy metals are used as catalysts in the polyester-forming reaction, such plastics are not desirably used in such applications where food or water is directly contacted with the plastics from the aspect of safety. In addition, the safety of intermediary substances formed during the degradation process in the natural environments has not been confirmed. On the other hand, the p(3HB-CO-3HV) is a polyester, which acts as a storage substance for accumulating a particular microorganism. Since synthesis route and degradation route of the polyester are clearly identified, no problems are posed sanitarily. Moreover, since the plastics undergo complete degradation, no safety problems are posed when the plastics are allowed to be degraded in natural environments.

However, there are some drawbacks in the p(3HB-CO-3HV) in that elongation is small and the material is brittle. For instance, in the case where the p(3HB-CO-3HV) is used as a laminating material for paper containers, since the p(3HB-CO-3HV) does not have sufficient flexibility against bending, cracks are generated at the bent portions, thereby giving causes for water leakage. Further, a coating resin has to be bonded in a molten state at pasted portions during the working process for moulding the material into a paper container. Therefore, a material with high heat seal property is in demand.

Also, as in the case of the p(3HB-CO-3HV) where the polyester comprises 3HB as a main component, thermal decomposition is likely to take place at high temperatures. In fact, it has such a thermally decomposing property that rapid decomposition proceeds when the temperature exceeds 200° C. On the other hand, a temperature at which the polyester is moulded from a die, in other words, a working temperature, has to be set higher than the melting point of the polyester used. Since the homopolymers of p(3HB) have a melting point of about 180° C., technological difficulty is posed in that the working temperature has to be controlled within a narrow temperature range of 180° to 200° C.

Accordingly, an object of the present invention is to provide a laminate having large impact resistance and being free from water leakage and generation of cracks against bending, and further being able to enjoy a wider range for the working temperature by using a copolymer, as a laminating material, the copolymer not only having fast degradation speed and safety but also being free from the problems of brittleness and too little elongation.

Another object of the present invention is to provide a wrapping material comprising the laminate.

Still another object of the present invention is to provide a container made of the laminate.

These and other objects of the present invention will be apparent from the following description.

SUMMARY OF THE INVENTION

As a result of intense studies in view of solving the above problems, the present inventors have found that a copolymer consisting essentially of 3-hydroxybutyrate and 3-hydroxyhexanoate gives suitable melt viscosity for lamination at an even lower temperature by utilizing for property that its thermal decomposition temperature does not substantially change even when a copolymer is formed, while the melting point and the degree of crystallization of the copolymer are lowered. They have also found that a laminate comprising a base material and the above copolymer, the copolymer being laminated at least on one side of paper, has excellent biodegradability and high flexibility against bending. The present invention has been completed based upon these findings.

In sum, the present invention is concerned with the following.

(1) A laminate comprising a base material and a copolymer consisting essentially of 3-hydroxybutyrate and 3-hydroxyhexanoate, the copolymer being laminated on at least one side of the base material;

(2) A wrapping material comprising a laminate comprising a base material and a copolymer consisting essentially of 3-hydroxybutyrate and 3-hydroxyhexanoate, the copolymer being laminated on at least one side of the base material; and (3) A container made of a laminate comprising a base material and a copolymer consisting essentially of 3-hydroxybutyrate and 3-hydroxyhexanoate, the copolymer being laminated on at least one side of the base material.

DETAILED DESCRIPTION OF THE INVENTION

The present invention will be described in further detail below.

The copolymers used in the present invention are copolymers consisting essentially of 3-hydroxybutyrate and 3-hydroxyhexanoate (simply abbreviated as "p(3HB-CO-3HHx)").

The contents of each component in the above copolymers are not particularly limited, and it is desired that the content of the 3-hydroxyhexanoate in the copolymer is 3 to 25 mol %, preferably 5 to 15 mol %. From the aspect of lowering the working temperature, the content of the 3-hydroxyhexanoate is preferably 3 mol % or more, and from the aspect of suppressing the lowering of the crystallization speed, the content is preferably 25 mol % or less.

In the p(3HB-CO-3HHx), the addition of the second component 3HHx serves to 1) not significantly lower the thermal decomposition temperature, 2) remarkably lower the melting point, and 3) remarkably lower the degree of crystallization. Therefore, the addition of 3HHx enables to provide a preferred melt viscosity for lamination at an even lower temperature, so that the thermal energy required for melting can be cut down.

The p(3HB-CO-3HHx) and a method for production thereof are disclosed in Japanese Patent Laid-Open No. 5-93049 (corresponding to U.S. Pat. No. 5,292,860). The method disclosed in the above publications is a method for obtaining a polymer from *Aeromonas caviae*, a microorganism belonging to the genus Aeromonas. The *Aeromonas caviae*-producing p(3HB-CO-3HHx) is a random copolymer. In order to control the 3HHx component, the resulting copolymer may be a blend with another p(3HB-CO-3HHx) having a different 3HHx content, or a blend with a homopolymer of p(3HB).

The laminate of the present invention comprises a base material and a copolymer consisting essentially of 3-hydroxybutyrate and 3-hydroxyhexanoate, the copolymer being laminated on at least one side of the base material. In the present specification, the laminate is a product obtained by laminating films or sheet materials, which may be used to prepare wrapping materials and containers. The wrapping materials may be, for instance, food wrapping films or sheets, mulch films for agricultural use, and the containers may be, for instance, paper containers and plastic containers. Also, the base materials may be, for instance, papers, starch sheets, cellulose sheets, aliphatic polyesters, and the like.

The method for laminating the above p(3HB-CO-3HHx) with paper may be any method generally employed in the production of laminated plastic papers such as laminated polyethylene papers, including a method for laminating plastic films to paper and a method for forming a moulding coating of plastics to paper. Also, the method of moulding laminates into paper containers may be carried out in the same manner as the method of moulding conventional plastic laminated papers. For example, moulding may be conducted by using such moulding machines as paper cup moulding machines, die cutting machines, sack-making machines, and gluing and folding machines. Also, the laminate of the present invention may be prepared by forming the above copolymer on one side of the base material, or by forming the copolymer on both sides of the base material.

When laminating the copolymer by the above lamination method, in the adhesion of the paper surface and the plastic surface, plastics melted by applying heat are filled in the spacing of the paper fibers, so that the paper and the plastics are firmly adhered by cooling and fixing the paper and plastics. However, plastics having properties of high melting points and high degrees of crystallization are likely to have high melt viscosities, and molten products of such plastics are pressed onto the paper without sufficiently penetrating the spacing of the paper fibers, thereby making lamination insufficient. Such a laminate does not have sufficient laminate strength. However, as shown in Table 1, since the p(3HB-CO-3HHx) used in the present invention contains a 3HHx unit, the degree of melting point drop and the extent of lowering the degree of crystallization become large, thereby making it possible to obtain desired melt viscosities for lamination at even lower temperatures. Therefore, the p(3HB-CO-3HHx) is extremely highly suitable as laminating materials.

The p(3HB-CO-3HHx) used in the present invention may be laminated with paper by a conventionally employed T-die method, to give a laminate for paper containers. In this case, the moulding temperature (working temperature) is preferably from 130° to 190° C., more preferably from 140° to 170° C. From the aspects of significantly lowering the load of motor during moulding and forming thin layer from a molten layer, the moulding temperature is preferably 130° C. or more. On the other hand, from the aspects of inhibiting thermal decomposition and inhibiting neck-in of the molten layer during formation of laminate, the moulding temperature is preferably 190° C. or less.

On the other hand, as shown in Tables 1 and 2, the p(3HB-CO-3HV), having a content of the 3HV unit, a second component, of 10 mol % has a melting point of 140° C., which is higher by 11° C. than the melting point of the p(3HB-CO-3HHx) having a 3HHx unit content of 10 mol %. Therefore, in the case of working the p(3HB-CO-3HV), it must be worked under conditions as close to the thermal decomposition temperature as possible. Therefore, the temperature control becomes very difficult as the temperature setting range is narrowed.

The 3HHx unit is essentially the same as the 3HV unit except that one methylene group is added to the side chain of the 3HV unit. Since the side carbon chain is longer by one methylene group, it would be more difficult to integrate such a unit in an α-helix structure in the polymer. For this reason, as the 3HHx content increases, the degree of crystallization of the polymer dramatically lowers. Therefore, the p(3HB-CO-3HV) is significantly different from the p(3HB-CO-3HHx), in that the structural difference between the 3HB unit and the 3HV unit is small, so that even when the 3HV unit content is increased, no dramatic lowering in the degree of crystallization takes place.

In other words, when compared with the 3HV unit, the inclusion of the 3HHx unit is highly effective in deformation of the structure of the homopolymer p(3HB), the 3HHx unit seemingly serving as a defect in the crystal lattice. On the other hand, the 3HV unit is structurally different from the 3HB unit only by addition of one methylene group at the side chain thereof. Therefore, when the 3HV and the 3HB constitute the copolymer, it has been made clear that the resulting copolymer has a 3HB-type crystal structure in the case of a high 3HB unit content, and the resulting copolymer has a 3HV-type crystal structure in the case of a high 3HV unit content. Therefore, the resulting polymer has a high degree of crystallization even when a copolymer is formed. Another feature of the inclusion of the 3HV unit is that the degree of the melting point drop does not become large, which makes it difficult to set the working temperature during the moulding.

On the other hand, when the p(3HB-CO-3HHx) is used, a significant decrease in the working temperature can be achieved because only addition of a small amount of the 3HHx unit would dramatically lower the melting point. Therefore, it is made possible to prevent thermal decomposition during working and significantly reduce the energy consumption.

In the copolymer used in the laminate of the present invention, preferred melt viscosities for lamination can be obtained at a lower temperature, and the bending strength of the copolymer is high. Therefore, the working temperature during lamination can be made even lower, and the film thickness of the laminated film can be made even thinner. For instance, in a case where paper is used as a base material, the working temperature is preferably 130° to 190° C., more preferably 140° to 170° C., and the thickness of the laminated film is preferably from 5 to 200 µm, more preferably from 5 to 50 µm.

The laminate of the present invention obtained by using the p(3HB-CO-3HHx) has excellent biodegradability as a product. Also, in a case where the 3HHx content is from 3 to 25 mol %, its lamination strength is high and no cracks are generated against bending, thereby making it excellent material for practical purposes. Moreover, since the working temperature can be controlled low, the thermal deterioration does not take place, and thus making its workability excellent.

EXAMPLES

The present invention is hereinafter described in more detail by means of the following working examples, without intending to restrict the scope of present invention thereto.

Test Example

The effects of addition of the 3HV unit and the 3HHx unit, each being a second component, upon the properties of the p(3HB-CO-3HV) and the p(3HB-CO-3HHx) were studied. The results of the p(3HB-CO-3HHx) are shown in Table 1, and the results of the p(3HB-CO-3HV) are shown in Table 2. Incidentally, the degrees of crystallinity were measured by an X-ray diffraction method, the tensile strength and the elongation at breakage were measured by tensile test (a method according to JIS K-7113), and the melting point was measured by the differential scanning calorimeter (DSC).

TABLE 1

| Properties | 3HHx (mol %) Content | | | | |
|---|---|---|---|---|---|
| | 0 | 10 | 14 | 17 | 31 |
| Degree of Crystallinity (%) | 60 ± 5 | 44 ± 5 | 40 ± 5 | 38 ± 5 | 24 ± 5 |
| Tensile Strength (MPa) | 43 | 21 | 23 | 20 | 6 |
| Elongation at Breakage (%) | 5 | 400 | 760 | 800< | 800< |
| Melting Point (° C.) | 180 | 129 | 123 | 119 | 73 |

TABLE 2

| Properties | 3Hv (mol %) Content | | |
|---|---|---|---|
| | 0 | 10 | 20 |
| Degree of Crystallinity (%) | 60 ± 5 | 55 ± 5 | 52 ± 5 |
| Melting Point (° C.) | 180 | 140 | 130 |
| Tensile Strength (MPa) | 40 | 25 | 20 |
| Elongation at Breakage (%) | 8 | 20 | 50 |

Incidentally, the p(3HB-CO-3HV) and the p(3HB-CO-3HHx), each respectively having a composition shown in Table 1 or 2, were obtained by following procedures. p(3HB) and p(3HB-CO-3HV) were obtained by the steps of cultivating *Alcaligenes eutrophus* (ATCC 17699) at 30° C. for 8 hours in a medium including a mixed carbon source of butyric acid and valeric acid being adjusted to a mixing ratio as shown in Table 3 and yeast extract (pH 7.0); and then extracting p(3HB) and p(3HB-CO-3HV) from the bacterial cells.

Also, p(3HB-CO-3HHx) was obtained by the steps of cultivating *Aeromonas caviae* FA-440 (FERM BP-3432) at 30° C. for 48 hours in a medium including oleic acid as a carbon source and yeast extract, the concentration of oleic acid being adjusted to that shown in Table 4 (pH 7.0); and then extracting p(3HB-CO-3HHx) from the bacterial cells.

TABLE 3

| 3HV (mol %) Content | Mixing Ratio (% by weight) | |
|---|---|---|
| | Butyric acid | Valeric acid |
| 0 | 100 | 0 |
| 10 | 92 | 8 |
| 20 | 83 | 17 |

TABLE 4

| 3HHx (mol %) Content | Concentration of Oleic Acid (% by weight) | Microorganism Used |
| --- | --- | --- |
| 10 | 1 | Aeromonas hydrophila OL338 |
| 14 | 0.5 | Aeromonas hydrophila OL338 |
| 17 | 2 | Aeromonas caviae FA440 |
| 31 | 0.5 | Aeromonas caviae FA440 |

As is clear from the above results, it has been found that in the p(3HB-CO-3HHx), a desired melt viscosity for lamination can be obtained at a low temperature, because the extent of lowering the melting point and the extent of lowering the degree of crystallization are large by addition of the 3HHx unit. Thus, the p(3HB-CO-3HHx) is found to be a highly preferred material for lamination. Also, a feature of this polymer is that the elongation at breakage increases dramatically as the 3HHx component increases, so that elastomeric property thereof becomes remarkable. Therefore, it has been found that in the case of working the p(3HB-CO-3HHx) into a laminate, the flexibility against bending of the resulting copolymer is high.

On the other hand, in the p(3HB-CO-3HV), the effects of the addition of 3HV are not comparatively large, and the problems in the working conditions, particularly in temperature control, are yet to be solved.

Example 1

Aeromonas caviae FA-440 (FERM BP-3432) was cultivated at 30° C. for 48 hours in a medium including 2% by weight of olive oil and 2% by weight of yeast extract (pH 7.0). Next, the culture broth was centrifuged, and bacterial cells were collected, and washed with distilled water and then with ethanol. Thereafter, the washed bacterial cells were dried under a reduced pressure to yield dried cells. The resulting dried cells were extracted with chloroform, to dissolve the polymer in the chloroform. After removing cell residue from the extract, a 5-fold amount of methanol was added to the extract to precipitate and collect the polymer precipitates. The resulting polymer precipitates were dried to obtain the polymer.

By the method described above, the p(3HB-CO-3HHx) was obtained (3HHx: 10 mol %). Incidentally, the content of the monomeric component in the copolymer was measured by subjecting the resulting copolymer to methanolysis at 100° C. for 140 minutes under acidic conditions with sulfuric acid to covert the monomers into methyl esters, and analyzing by capillary gas chromatography.

Each of the p(3HB-CO-3HHx) (3HHx: 10 mol %) was formed into a coating with 30 μm in thickness on one side of the paper board by T-die moulding method, wherein the working temperatures were set at 170° C. and 150° C., respectively. The lamination strength of the laminates obtained as prepared above was measured. As a result, both laminated paper boards had sufficient lamination strengths, as evaluated by peeling the coating from the paper fibers of the paper board (lamination strength of no less than 300 g/15 mm). Incidentally, the lamination strength, a measure of a heat seal property at a heat seal portion, was evaluated using 15 mm samples with 90° peeling test (g/15 mm).

Comparative Example 1

A coating was formed on a paper board with a p(3HB-CO-3HV) (3HV: 10 mol %) ("BIOPOL", manufactured by ZENECA Limited) under the same conditions as in Example 1. Even in the case where the working temperature was 170° C., the coating thickness was unstable and the lamination strength was 100 g/15 mm, showing incomplete adhesion. In the case where the working temperature was 150° C., even the moulding process was difficult.

Example 2

The laminate coated at a working temperature of 170° C. in Example 1 was moulded by a paper cup moulding machine into a paper cup, wherein a plastic side was arranged inside. Water was filled up to about 80% of the paper cup obtained above, and the cup was kept standing to check water leakage from the paper cup. As a result, no water leakage was found.

Comparative Example 2

The laminate coated at a working temperature of 170° C. in Comparative Example 1 was moulded into a paper cup in the same manner as in Example 2. Also, the water leakage of the paper cup was checked. As a result, water leakage was found because cracks occurred in the pasted portion.

Example 3

5 cm×5 cm pieces of laminates, each comprising one of the copolymers of the p(3HB-CO-3HHx) and the p(3HB-CO-3HV) and paper, the copolymer being laminated on paper, were immersed in activated sludge, to evaluate degradability of the plastics parts. The coating parts comprising the p(3HB-CO-3HHx), even the part entering into the paper fibers, completely disappeared in a period of 2 to 3 weeks, because of the fast degradation by the actions of the microorganisms in the activated sludge. On the other hand, the p(3HB-CO-3HV) was completely degraded in a period of 4 to 6 weeks.

Example 4

The p(3HB-CO-3HHx) (3HHx content: 2 mol %) was melted in the same manner as in Example 1. However, a preferred melt viscosity suitable for the moulding process was not obtained unless the working temperature was raised to 190° C. or more. Also, when the working temperature was set at temperature conditions exceeding 200° C., the thermal decomposition of the polymer occurred and satisfactory laminates could not be obtained, showing that the working conditions of this polymer tended to be more severe.

On the other hand, when the 3HHx content exceeded 30 mol %, it was found that the moulding process can be carried out at a working temperature of 130° to 150° C., and that the laminate was difficult to be wound (the blocking was likely to occur) because of its low crystallization speed, though the lamination strength was sufficient.

Incidentally, the p(3HB-CO-3HHx) having a 3HHx content of 2 mol % and the p(3HB-CO-3HHx) having a 3HHx content of 30 mol % were obtained as follows.

Aeromonas hydrophila OL 338 was cultivated at 30° C. for 48 hours in a medium including 2% by weight of olive oil and 2% by weight of yeast extract (pH 7.0). Next, the polymer was collected from the resulting bacterial cells in the same manner as in Example 1, to yield a p(3HB-CO-3HHx) having a 3HHx content of 2 mol %.

Also, Aeromonas caviae FA-440 (FERM BP-3432) was cultivated at 30° C. for 24 hours in a medium including 2% by weight of polypeptone, 2% by weight of yeast extract and 2% by weight of meat extract (pH 7.0). After collecting the bacterial cells, the bacterial cells were added into phosphate buffer including 0.5% by weight of olive oil (without nitrogen sources), followed by cultivating at 30° C. for 72 hours (pH 7.0). The polymer was collected from the bacterial cells obtained as above in the same manner as in Example 1, to yield a p(3HB-CO-3HHx) having a 3HHx content of 30 mol %.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laminate comprising a base material and a copolymer consisting essentially of 3-hydroxybutyrate and 3-hydroxyhexanoate, said copolymer being laminated on at least one side of the base material.

2. The laminate according to claim 1, wherein said base material is a paper.

3. The laminate according to claim 1, wherein the content of 3-hydroxyhexanoate in the copolymer is 3 to 25 mol %.

4. A wrapping material comprising a laminate comprising a base material and a copolymer consisting essentially of 3-hydroxybutyrate and 3-hydroxyhexanoate, said copolymer being laminated on at least one side of the base material.

5. The wrapping material according to claim 4, wherein said base material is a paper.

6. The wrapping material according to claim 4, wherein the content of 3-hydroxyhexanoate in the copolymer is 3 to 25 mol %.

7. A container made of a laminate comprising a base material and a copolymer consisting essentially of 3-hydroxybutyrate and 3-hydroxyhexanoate, said copolymer being laminated on at least one side of the base material.

8. The container according to claim 7, wherein said base material is a paper.

9. The container according to claim 7, wherein the content of 3-hydroxyhexanoate in the copolymer is 3 to 25 mol %.

* * * * *